United States Patent
Collins et al.

(10) Patent No.: US 7,435,072 B2
(45) Date of Patent: Oct. 14, 2008

(54) METHODS AND SYSTEMS FOR PRODUCING AN OBJECT THROUGH SOLID FREEFORM FABRICATION

(75) Inventors: David C Collins, Philomath, OR (US); Shawn D Hunter, Corvallis, OR (US); Jeffrey Allen Nielsen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 960 days.

(21) Appl. No.: 10/453,113

(22) Filed: Jun. 2, 2003

(65) Prior Publication Data

US 2004/0239009 A1   Dec. 2, 2004

(51) Int. Cl.
*B29C 47/00*   (2006.01)

(52) U.S. Cl. .................. 425/375; 425/381; 425/461; 425/174.4

(58) Field of Classification Search .............. 425/174.4, 425/375, 381, 461
See application file for complete search history.

(56) References Cited

U.S. PATENT DOCUMENTS

| | | | | |
|---|---|---|---|---|
| 4,665,492 A | * | 5/1987 | Masters | 700/119 |
| 4,961,154 A | | 10/1990 | Pomerantz et al. | |
| 5,121,329 A | * | 6/1992 | Crump | 700/119 |
| 5,139,711 A | | 8/1992 | Nakamura et al. | |
| 5,143,663 A | * | 9/1992 | Leyden et al. | 264/401 |
| 5,204,055 A | | 4/1993 | Sachs et al. | |
| 5,340,656 A | | 8/1994 | Sachs et al. | |
| 5,503,785 A | | 4/1996 | Crump et al. | |
| 5,595,703 A | | 1/1997 | Swaelens et al. | |
| 5,598,340 A | * | 1/1997 | Medard et al. | 700/120 |
| 5,667,820 A | * | 9/1997 | Heller et al. | 425/135 |
| 5,687,788 A | | 11/1997 | Caldarise et al. | |
| 5,824,259 A | | 10/1998 | Allanic et al. | |
| 6,036,777 A | | 3/2000 | Sachs | |
| 6,193,923 B1 | * | 2/2001 | Leyden et al. | 264/401 |
| 6,228,437 B1 | * | 5/2001 | Schmidt | 427/559 |
| 6,322,728 B1 | * | 11/2001 | Brodkin et al. | 264/19 |
| 6,572,807 B1 | | 6/2003 | Fong | |
| 6,658,314 B1 | * | 12/2003 | Gothait | 700/119 |
| 6,665,574 B2 | * | 12/2003 | Farren | 700/120 |
| 6,685,866 B2 | * | 2/2004 | Swanson et al. | 264/308 |
| 6,799,959 B1 | * | 10/2004 | Tochimoto et al. | 425/130 |
| 6,808,659 B2 | * | 10/2004 | Schulman et al. | 264/16 |
| 6,821,473 B2 | * | 11/2004 | Hiizumi et al. | 264/401 |
| 6,838,035 B1 | | 1/2005 | Ederer et al. | |
| 6,841,116 B2 | * | 1/2005 | Schmidt | 264/401 |
| 6,905,645 B2 | * | 6/2005 | Iskra | 264/128 |
| 2003/0083771 A1 | * | 5/2003 | Schmidt | 700/119 |

FOREIGN PATENT DOCUMENTS

| | | |
|---|---|---|
| DE | 19538257 | 4/1996 |
| EP | 0686480 | 11/2001 |
| EP | 1358855 | 11/2003 |
| JP | 5301293 | 11/1993 |
| JP | 2001009920 | 1/2001 |

OTHER PUBLICATIONS

European Search Report for Application No. EP 04253153. Report issued Oct. 5, 2006.

* cited by examiner

*Primary Examiner*—Robert B. Davis
*Assistant Examiner*—G. Nagesh Rao (57) ABSTRACT

A method of producing an object through solid freeform fabrication, the method including fabricating a support structure about at least a portion of the object by applying a binder or focused energy to a build material.

15 Claims, 5 Drawing Sheets

METHODS AND SYSTEMS FOR PRODUCING AN OBJECT THROUGH SOLID FREEFORM FABRICATION

BACKGROUND

Solid freeform fabrication is a process for manufacturing three-dimensional objects, for example, prototype parts, production parts, models and working tools. Solid freeform fabrication is an additive process in which an object, which is described by electronic data, is automatically built, usually layer-by-layer, from base materials.

There are a variety of different freeform fabrication systems that use different processes to form a desired object. Some systems eject the base material from which the object being formed is built up layer-by-layer. Other systems eject a binder selectively into a powdered base material.

Many solid freeform fabrication systems require the construction of support structures that must be attached below or beside the object being formed. These structures support the object being formed until it is completed and solidified. For example, stereolithography, polymer jetting, jetted wax, and fused deposition systems can all require one or more support structures to be fabricated as part of the build process.

The support structures of the systems mentioned above, however, create several issues. One of the issues associated with the support structures of current systems is the difficulty in removing that support structure from the object being fabricated after the fabrication process is complete. The support structures may be physically connected to the object being formed. Consequently, the process of removing the support structures may damage the object being formed.

Another issue with current systems is the general requirement for support structures to be relatively dense. Support structures range from polymer jetting, where every voxel of the object is supported, to stereolithography, where a matrix of relatively dense support structures is built to support the object in a liquid bath. These dense support structures can be both expensive and time consuming to fabricate.

However, another family of solid freeform fabrication systems is powder-based. Powder-based systems generally create objects by ejecting a binder onto a flat bed of powdered build material. Each powder layer may be dispensed or spread as a dry powder or a slurry within a build area. Wherever a binder is selectively ejected into the powder layer, the powder is bound into a cross section or layer of the object being formed. It is also possible to use focused energy to bind the powder together. Selective laser sintering (SLS) is an example of this approach.

In a powder-based system, unbound powder acts as the primary support for the object being formed. This is advantageous compared to the systems mentioned above, because no explicit support structures are needed. Thus, there are no support structures to remove, no material is wasted to create the support structures, and no machine throughput availability is sacrificed for building support structures. In addition, all of the unbound powder can be removed and reused.

However, one of the issues with powder-based systems is the difficulty in achieving tightly packed powder in the build regions of the fabrication machines. Many factors may cause the powder to shift or settle after layers of powder are spread. Some of the factors that cause powder shifting and/or settling may include mechanical vibration of the system equipment, spreading of subsequent layers, and settling of the powder under the weight of an object being produced in the build area.

When powder shifts and/or settles during the fabrication process, the object being formed will also sink or move. The object may move in any number of directions. This movement causes a loss of dimensional accuracy, as the fabrication systems have no way to measure or compensate for object movement during the fabrication process. If, for example, an object sinks as powder settles, a layer spread after the settling will be thicker than specified. As the fabrication process continues, the overall thickness of the object being formed becomes larger than intended, and the accuracy of the object dimensions is compromised.

SUMMARY

In one of many possible embodiments, the present invention provides a method of producing an object through solid freeform fabrication, the method including fabricating a support structure about at least a portion of the object by applying a binder or focused energy to a build material.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

The present specification describes techniques for creating objects by a solid freeform fabrication system, preferably using fluid ejection or sintering technology, while reducing the effects of build material shifting and/or settling as described above. As used in this specification and the appended claims, the term "binder" refers to adhesives or any other substance that is ejected to selectively bind a build material together into a desired product. "Build material" is any material from which a freeform fabrication system forms a desired product and may include a powdered build material that can be bound by the application of a liquid binder or focused energy (e.g. a laser). The term "voxel" describes a volumetric pixel, which is an addressable volume having length in x, y, and z coordinates. Also, the term "sparse" means widely spaced or scattered, or not densely packed.

Figure 1:
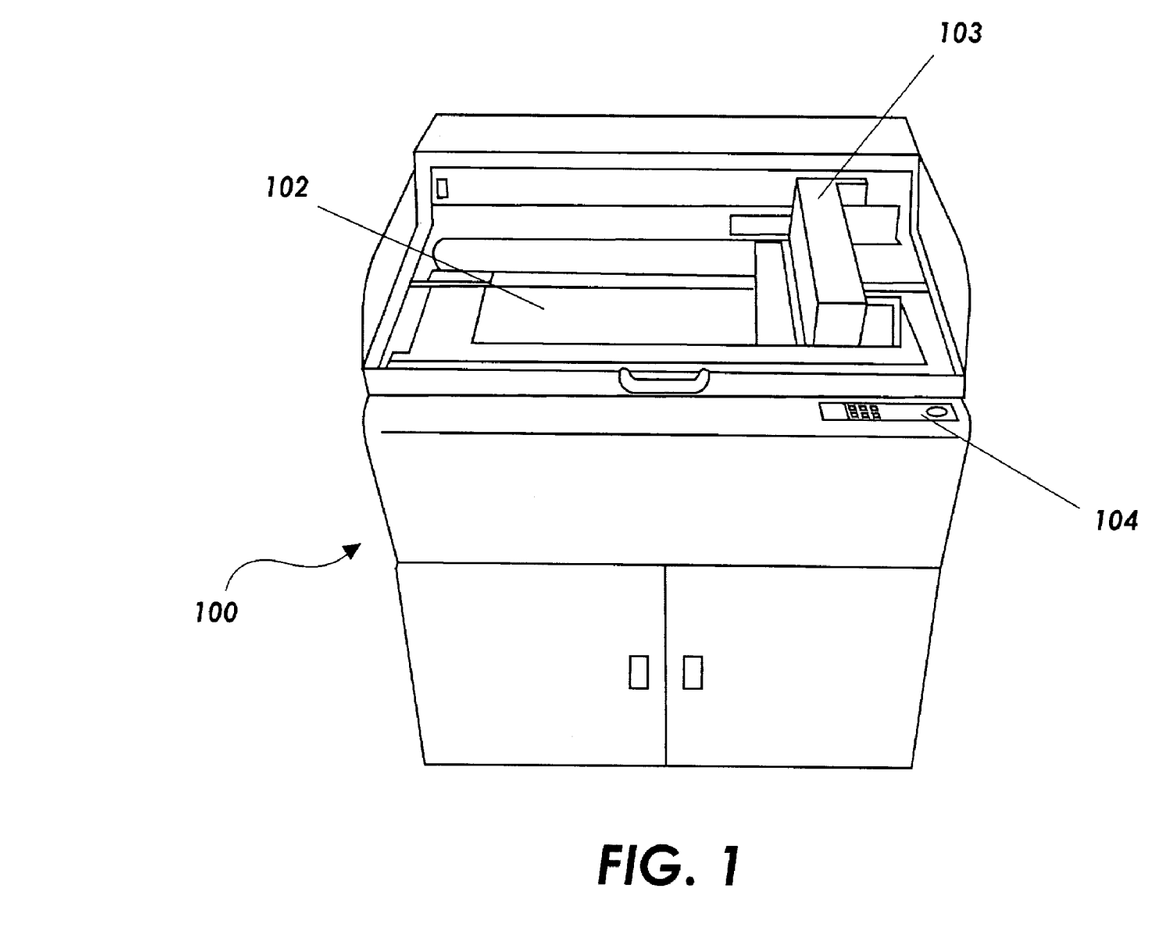
FIG. 1 is a perspective view of a solid freeform fabrication system that may be used to implement embodiments of the present invention.

Referring now to the figures, and in particular to FIG. 1, one solid freeform fabrication system using liquid ejection or selective sintering technology is described. Embodiments of the present invention may be incorporated into the freeform fabrication system shown. As noted above, the freeform fabrication system may be a powder-based system.

In the solid freeform fabrication system (100) of FIG. 1, a build material such as a bulk powder substance is used to form each individual layer of a desired object within a fabrication bin (102). To build each layer, a quantity of powder is provided from a supply chamber. A roller, preferably incorporated into a moving stage (103), distributes and compresses the powder to a desired thickness at the top of the fabrication bin (102).

A binding device such as a liquid binder ejection apparatus (e.g. a drop-on-demand or continuous liquid ejection apparatus, etc.) or a laser may be contained by the moving stage (103) of the solid freeform fabrication system (200). Alternatively, the solid freeform fabrication system (100) may include multiple liquid binder ejection apparatuses, each separately containing one or more ejection fluid. The fluid ejection apparatus or laser may also be separate from the moving stage (103) according to some embodiments.

When the moving stage (103) has distributed the powder in a binder-ejection system, the fluid ejection apparatus deposits binder onto the powder in the fabrication bin (102) in a two dimensional pattern. Similarly, if the fabrication system incorporates selective laser sintering, the laser melts the powder particles to bind them to one another in the two dimensional pattern. This two dimensional pattern is a cross section of the desired object being fabricated, or, according to aspects of the invention, a cross section of a support structure to stabilize the object and/or the powder used to build the object as discussed in more detail below.

The powder becomes bonded in the areas where the binder is deposited or focused energy has been applied, thereby forming a solid layer of the object being formed or a related support structure. The process is repeated with a new layer of powder being applied over the top of the previous layer in the fabrication bin (102). A next cross section of the desired product and/or support structure may then be built by ejecting binder or applying focused energy to the new powder layer. In addition to forming each cross-sectional layer of the object and/or support structure being fabricated, the adhesive binder or focused energy application can also bind adjacent or successive layers together.

The process continues until the desired object is entirely formed within the fabrication bin (102). The support structure and any extra powder that is not bonded may then be removed, leaving only the fabricated object. A user interface or control panel (104) is provided to allow the user to control the fabrication process.

The moving stage (103) of the solid freeform fabrication system (100) may include inkjet technology, such as continuous or drop-on-demand liquid ejection devices, for ejecting binder to form or color the layers of the desired object. Using continuous or drop-on-demand inkjet technology, the moving stage (103) may include one or more printheads to eject drops of binder that is clear or colored in a selective pattern to create the object or the support structure being fabricated.

Conventional powder-based freeform fabrication processes eject binder or apply focused energy only in the predetermined patterns necessary to fabricate the desired object. However, as discussed above, objects and powder tend to shift and sink within the fabrication bin (102), creating dimensional inaccuracies. Therefore, according to the principles described herein, a support structure for stabilizing the object and/or the powder may also be built within the fabrication bin (102) about the object. As used throughout the detailed description and claims, "about" refers to any location below, around, above, near, or surrounding the object. "About" also refers to locations between object features or stacked objects.

The support structure is built in the same manner the object is built. That is, the support structure is built by applying binder or focused energy to the powder (or other build material) in patterns intended to stabilize the object and/or the powder located about the object. By building a support structure about the object being fabricated, movement of the object and powder is reduced. Reducing the movement of the object and the powder increases the dimensional accuracy of the object.

Figure 2:
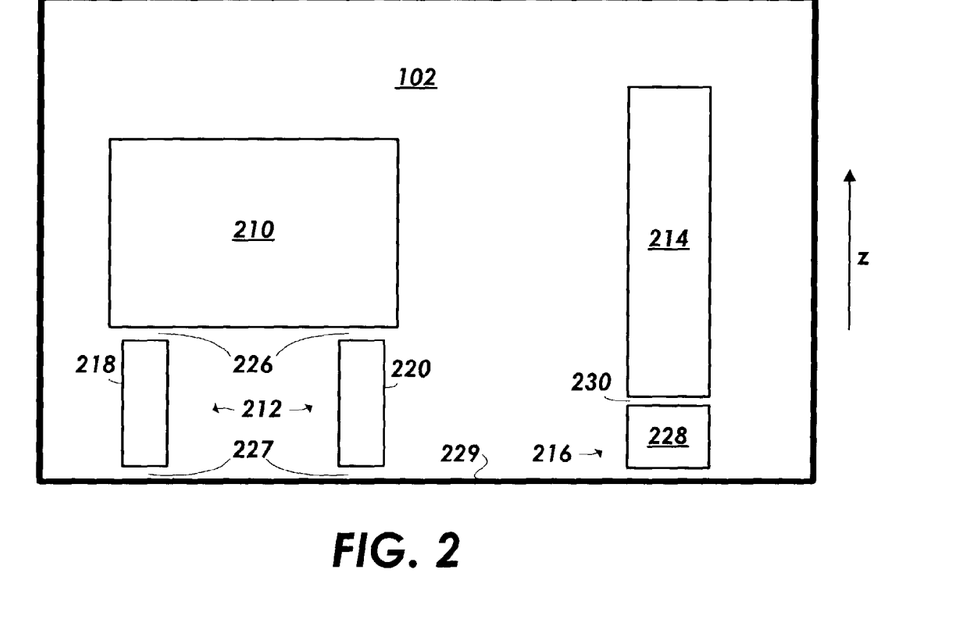
FIG. 2 is a side view of a build bin of the solid freeform fabrication system of FIG. 1 illustrating a support structure according to one embodiment of the present invention.
Figure 3:
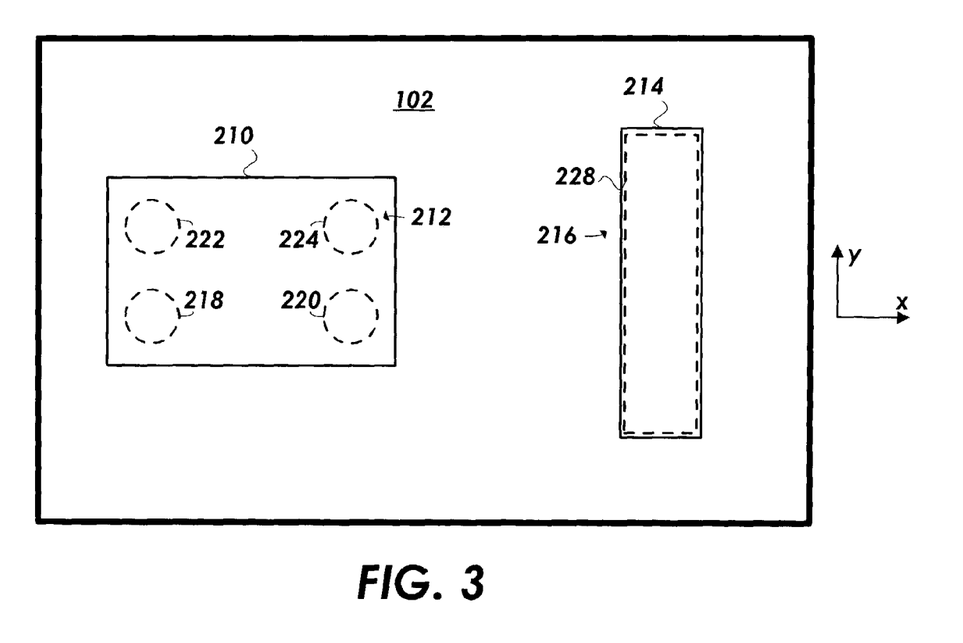
FIG. 3 is a top view of the build bin of FIG. 2.

FIGS. 2-7 illustrate a number of support structure configurations built within the fabrication bin (102, FIG. 1) about at least a portion of the object being formed. FIG. 2 illustrates a side view of a first object (210) and its associated first support structure (212). A second object (214) with its associated second support structure (216) is also shown. FIG. 3 illustrates a top view of the first and second objects (210 and 214) with their associated support structures (212 and 216). The support structures (212 and 216) and the objects being formed (214) are both fabricated by applying binder or focused energy to powder contained in the fabrication bin (102, FIG. 1) as described above.

According to the embodiments of FIGS. 2-3, the support structures (212 and 216) are built by applying binder to layers of powder disposed below the objects (210 and 214). Each of the first and second objects (210 and 214) and their associated support structures (212 and 216) are discussed in turn below.

The first support structure (212) includes a plurality of pillars (218 and 220) sparsely arranged below the first object (210). One or more additional pillars, such as a set of two more pillars (222 and 224) shown in FIG. 3, may also be located below the first object (210). The pillars (218/220/222/224) are shown with a generally circular cross section. However, the pillars may have any polygonal or irregular cross section. In addition, while each of the pillars (218/220/222/224) shown is substantially equal in dimension and shape, this is not necessarily so. There may be any number of pillars of various cross sections and dimensions adapted to support objects of any size and shape. The pillars need not be solid, they may be formed into any structural configuration.

As shown in FIG. 2, at least one layer (226) of unbound powder separates the first support structure (212) from the first object (210). As opposed to other solid freeform fabrication systems described above, the at least one layer (226) of unbound powder insulates the first object (210) from the first support structure (212) and there is no need for special techniques to remove the support structure (212) from the first object (210). Thus, the support structure (212) does not attach or damage the first object (210) as prior systems have done. Another one or more layers of unbound powder (227) may insulate the support structure (212) from a base (229) of the fabrication bin (102, FIG. 1) to facilitate easy removal of the support structure (212) when the object (210) is completed. However, according to some aspects, the support structure (212) extends all the way to the base (229).

The sparse arrangement of the pillars (218/220/222/224) is designed to fully support and stabilize the first object (210), while minimizing the time and material required to build them. According to some embodiments, an aggregate footprint area of the pillars is no more than 10% of a footprint area of the first object (210). In other embodiments, the aggregate footprint area of the pillars is between 10 and 100% of the footprint area of the first object (210). It will be appreciated by those of skill in the art having the benefit of this disclosure that tradeoffs between support area needed to adequately stabilize the objects being formed and time and materials used to build support structures may need to be made.

While the first support structure (212) includes multiple pillars sparsely arranged below the first object (210), the second support structure (216) includes a single pillar (228) below the second object (214). The single pillar (228) is also insulated from the second object (214) by at least one layer (230) of unbound build material to prevent attachment to the second object (214) while still providing adequate support. As with the first support structure, the second support structure (216) may also include at least one layer of unbound powder insulating it from the base (229) of fabrication bin (102, FIG. 1).

In contrast to the first support structure (212), the single pillar (228) of the second support structure (216) has a footprint area substantially the same as a footprint area of the second object (214). In addition, the cross section of the single pillar (228) is rectangular, substantially matching the cross section of the second object (214). The footprint area of a support structure may depend somewhat on the size and shape of the object that it must support and the throughput demands of the fabrication system (100, FIG. 1).

The support structures (212 and 216) prevent settling or sinking of the objects (210 and 214) within the fabrication bin. As noted above, it is common with powder-based solid freeform fabrication systems for objects to sink and move as they are fabricated due to the unstable nature of the powder. The support structures (212 and 216) arranged below the objects (210 and 214), according to principles discussed herein, stabilize the objects (210 and 214) and reduce or eliminate sinking of the objects without adding any new materials to the powder-based fabrication system (100, FIG. 1). Therefore, the dimensions of the objects (210 and 214) fabricated according to the principles discussed herein are much more accurate than conventional powder-based solid freeform fabrication techniques.

Further, the principles discussed herein may be implemented to stabilize the powder around the sides of an object. Objects fabricated through powder-based solid freeform fabrication systems often move in horizontal planes (in addition to sinking) when they are built without supports. The movement of powder around the sides of the object can lead to both horizontal movements and sinking of the object being formed. The movement is often a result of the unbound powder shifting around the object due to vibrations and various other movements. Therefore, according to some aspects, the support structures (212 and 216) may include walls disposed at least partially around the objects (210 and 214) as shown in FIG. 4.

Figure 4:
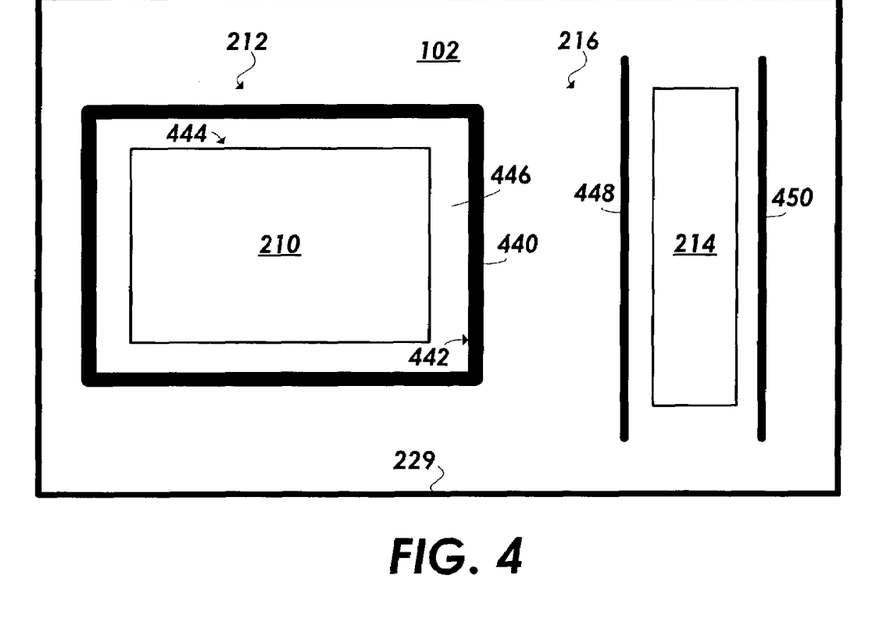
FIG. 4 is a top view of a build bin of the solid freeform fabrication system of FIG. 1 illustrating a support structure according to another embodiment of the present invention.

FIG. 4 illustrates a top view of the first and second objects (210 and 214) with their associated support structures (212 and 216) in an alternative arrangement. Again, however, the support structures (212 and 216) and the objects of interest (210 and 214) are both fabricated by applying binder or focused energy to powder contained in the fabrication bin (102, FIG. 1) as described above.

According to FIG. 4, the first support structure (212) is a continuous first wall (440) disposed around the first object (210). The first wall (440) has an interior surface (442) that matches or substantially matches a shape of an outer surface (444) of the first object, although this is not necessarily so. The first wall (440) may be any desired shape that facilitates stabilization of the powder or other build material in the vicinity of an object being built. The first wall (440) preferably extends all or substantially all the way to the base (229, FIG. 2) of the fabrication bin (102, FIG. 1).

As shown in FIG. 4, at least one voxel of unbound powder is preferably contained by an annulus (446) defined between the first wall (440) and the first object (210). Thus, there is no attachment between the first wall (440) and the first object (210) that would otherwise require a special separation technique that could damage the object. The annulus (446) between the first wall (440) and the first object (210) is preferably small (<1 inch), however any separation space that adequately stabilizes the powder surrounding the object (210) may be used.

While the first support structure (212) of FIG. 4 includes a continuous wall (440) disposed all the way around the first object (210), the second support structure (216) includes a pair of discontinuous walls (448 and 450) located only partially around the second object (214). Each of the first and second discontinuous walls (448 and 450) are preferably insulated from the second object (214) by at least one voxel of unbound build material to prevent a direct interface to the second object (214) while still providing adequate stabilization of the powder about the object. As with the first support structure (212), the second support structure (216) preferably extends all the way to the base (229, FIG. 2) of fabrication bin (102, FIG. 1), though this is not necessarily so.

In contrast to the first support structure (212), the discontinuous pair of walls (448 and 450) of the second support structure (216) is disposed sparsely around the second object (214). The second support (216) may be strategically placed adjacent only certain portions of the second object (214) in a manner that provides sufficient powder stabilization while minimizing the time and materials necessary to build the support structure (216).

The support structures (212 and 216) of FIG. 4 around the objects (210 and 214) reduce or prevent shifting or sinking of the powder and thus the objects (210 and 214) within the fabrication bin (102, FIG. 1). Therefore, the dimensions of the objects (210 and 214) are much more accurate than conventional powder-based solid freeform fabrication systems.

Further, it will be understood that the objects (210 and 214) and the first and second support structures (212 and 216) of FIG. 4 may be built simultaneously, layer by layer, so that the added time necessary to fabricate the support structures (212 and 216) is minimal. Sets of layers of powder may have a portion of binder or focused energy applied corresponding to the objects (210 and 214), as well as a portion of binder or focused energy applied corresponding to the support structures (212 and 216). Preferably, the portions of binder or focused energy corresponding to the objects (210 and 214) and the support structures (212 and 216) are spaced from one another.

Figure 5:
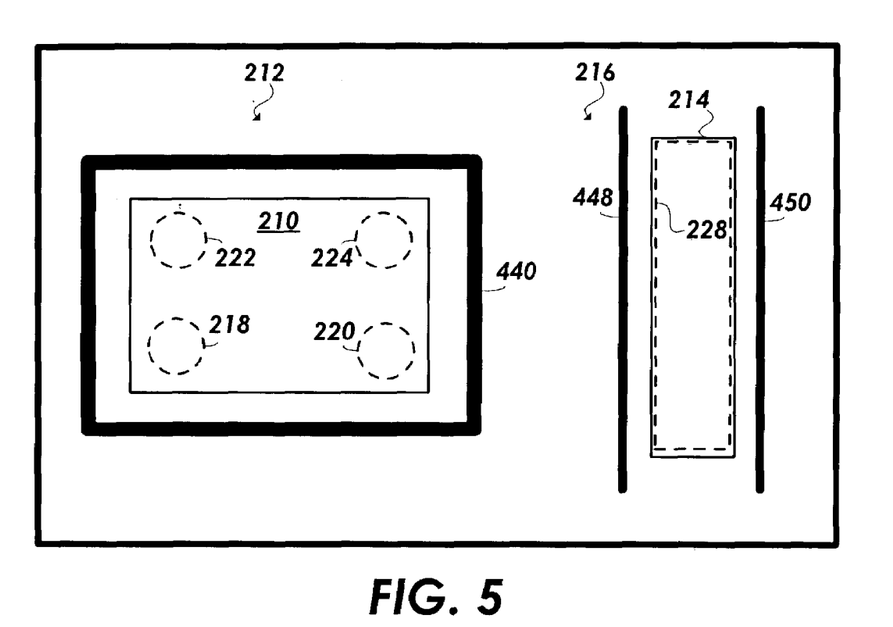
FIG. 5 is a top view of a build bin of the solid freeform fabrication system of FIG. 1 illustrating a support structure according to another embodiment of the present invention.
Figure 6:
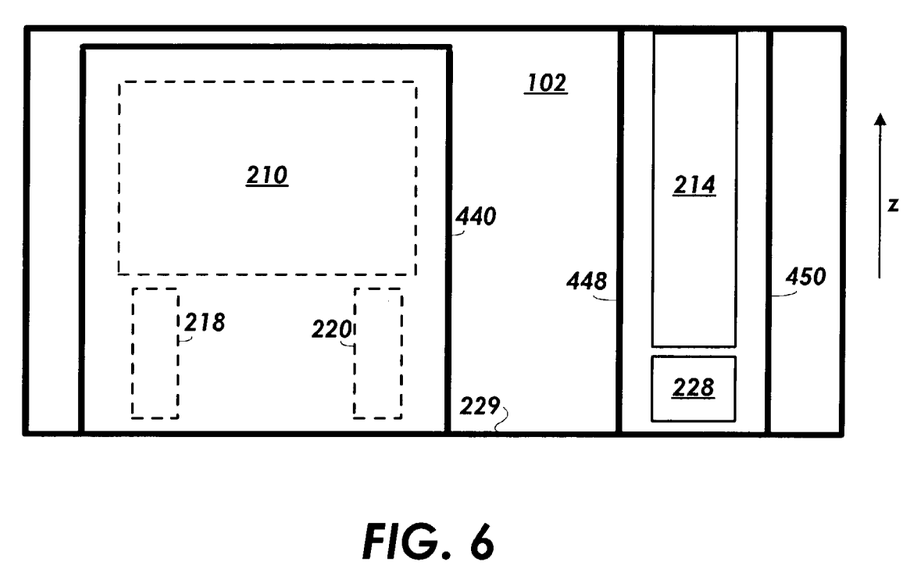
FIG. 6 is a side view of a build bin of the solid freeform fabrication system of FIG. 1 illustrating a support structure according to another embodiment of the present invention.

Turning next to FIGS. 5-6, the principles discussed with reference to FIGS. 2-4 may be combined. As shown in FIG. 5, the first and second support structures (212 and 216) may include both pillars (222, etc.) below the objects (210 and 214) and walls (440/448/450) around the objects. Such a combined arrangement may provide for exceptionally accurate object dimensions as the objects are supported from below while the powder around the objects is stabilized. FIG. 6 shows from a side view the walls (440/448/450) that may be used to stabilize the powder with the pillars (218 and 220) used to support the objects (210 and 214) from below.

Figure 7:
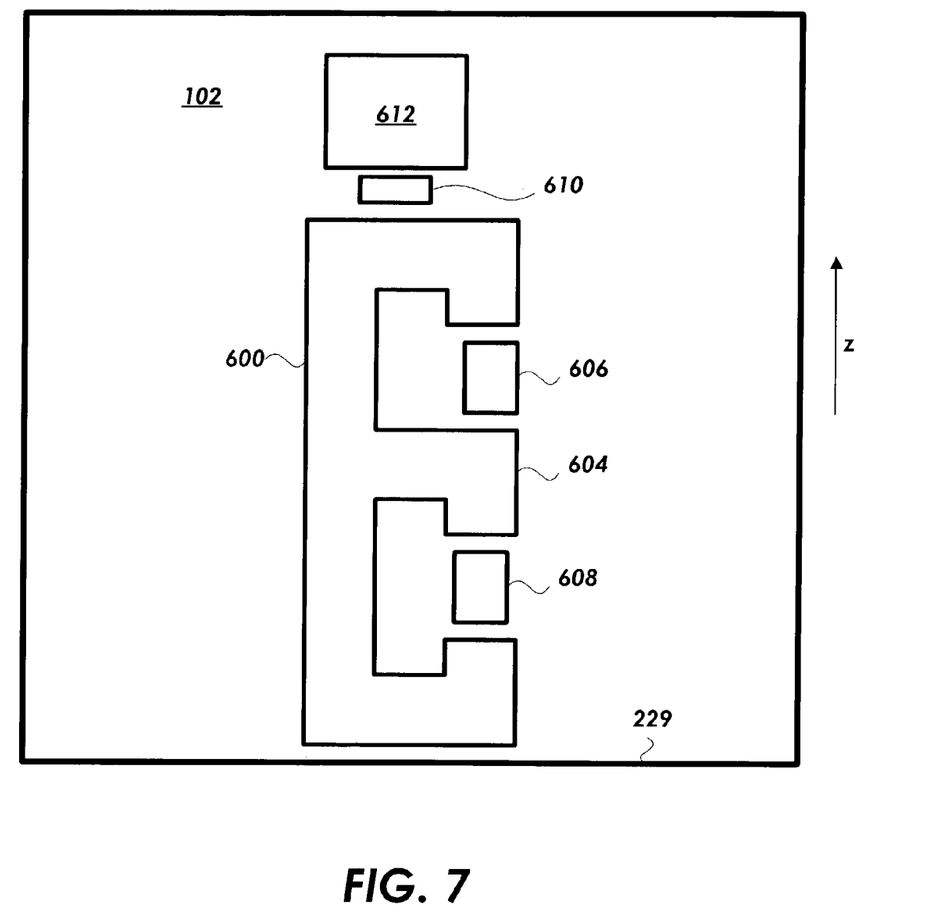
FIG. 7 is a side view of a build bin of the solid freeform fabrication system of FIG. 1 illustrating a support structure according to another embodiment of the present invention.

In addition, with reference to FIG. 7, support structures may be added between object features or stacked objects. As shown in FIG. 7, a first object (600) may have features such as first and second cantilever portions (602 and 604) that benefit from support. Accordingly, a pair of non-contact supports (606 and 608, respectively) may be built along with the first object (600) by applying binder fluid or focused energy to layers of powdered build material. Similarly, another non-contact support (610) is shown disposed between the first object (600) and a second object (612).

The preceding description has been presented only to illustrate and describe exemplary embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A solid freeform fabrication system comprising:
    a fabrication bin containing a quantity of build material;
    a movable stage for distributing successive layers of said build material in said fabrication bin to form an object;
    a binder device configured to selectively apply a binder or focused energy to said build material in said fabrication bin to build said object;
    said object being at least partially formed by said binder device from said build material in said fabrication bin and being disposed in said fabrication bin; and
    a support structure being at least partially formed from said build material in said fabrication bin by said binder device, said support structure being disposed about at least a portion of said object being formed so as to prevent shifting of said build material which would degrade said object being formed.

2. The system of claim 1, wherein said binder device comprises a liquid ejection apparatus comprising inkjet technology.

3. The system of claim 1, wherein said support structure comprises one or more pillars disposed below said object.

4. The system of claim 3, wherein one or more of said pillars are discontinuous, having individual portions separated from each other and at least one voxel of unbound build material positioned between said portions.

5. The system of claim 3, wherein said pillars are sparsely arranged and comprise an aggregate footprint area of about 10-100% of an object footprint area.

6. The apparatus system of claim 1, wherein said support structure comprises a wall disposed around at least a portion of said object.

7. The system of claim 6, wherein said support structure comprises discontinuous walls having individual portions separated from each other and at least one voxel of unbound build material positioned between said portions.

8. The system of claim 1, wherein said support structure comprises one or more structures disposed between adjacent features of said object.

9. The system of claim 1, wherein said binder device emits focused energy to sinter said build material.

10. The system of claim 1, further comprising a layer of unbound build material between said object being built and said support structure.

11. The system of claim 10, wherein said layer of unbound build material corresponds to a size of a voxel of said object being built.

12. The system of claim 1, further comprising a layer of unbound build material between said support structure and a base of said fabrication bin.

13. The system of claim 12, wherein said layer of unbound build material corresponds to a size of a voxel of said object being built.

14. The system of claim 1, wherein said binder device is further programmed to minimize an amount of time required to build said support structure.

15. The system of claim 3, wherein said one or more pillars comprise a plurality of separate pillars built below said object.

\* \* \* \* \*

UNITED STATES PATENT AND TRADEMARK OFFICE
CERTIFICATE OF CORRECTION

| | |
|---|---|
| PATENT NO. | : 7,435,072 B2 |
| APPLICATION NO. | : 10/453113 |
| DATED | : October 14, 2008 |
| INVENTOR(S) | : David C Collins et al. |

Page 1 of 1

It is certified that error appears in the above-identified patent and that said Letters Patent is hereby corrected as shown below:

In column 8, line 4, in Claim 6, after "The" delete "apparatus".

Signed and Sealed this

Twelfth Day of May, 2009

JOHN DOLL
*Acting Director of the United States Patent and Trademark Office*